United States Patent

Blomgren

[11] Patent Number: 5,098,207
[45] Date of Patent: Mar. 24, 1992

[54] OPTICAL FIBER SWITCH

[75] Inventor: Jack P. Blomgren, Red Wing, Minn.

[73] Assignee: Minnesota Mining and Manufacturing Company, Saint Paul, Minn.

[21] Appl. No.: 477,423

[22] Filed: Feb. 9, 1990

[51] Int. Cl.⁵ .......................... G02B 6/00; G02B 6/36
[52] U.S. Cl. ........................................ 385/16; 385/17
[58] Field of Search ................ 350/96.15, 96.20, 96.21

[56] References Cited

U.S. PATENT DOCUMENTS

| | | | |
|---|---|---|---|
| 4,189,206 | 2/1980 | Terai et al. | 350/96.20 |
| 4,223,978 | 9/1980 | Kummer et al. | 350/96.20 |
| 4,239,331 | 12/1980 | Aoyama | 350/96.20 |
| 4,239,332 | 12/1980 | Inbar | 350/96.20 |
| 4,245,886 | 1/1981 | Kolodzey et al. | 350/96.20 |
| 4,303,302 | 12/1981 | Ramsey et al. | 350/96.20 |
| 4,303,303 | 12/1981 | Aoyama | 350/96.20 |
| 4,322,126 | 3/1982 | Minowa et al. | 350/96.20 |
| 4,337,995 | 7/1982 | Tanaka et al. | 350/96.20 |
| 4,384,761 | 5/1983 | Brady et al. | 350/96.20 |
| 4,407,562 | 10/1983 | Young | 350/96.20 |
| 4,415,228 | 11/1983 | Stanley | 350/96.20 |
| 4,415,229 | 11/1983 | McCullough | 350/96.20 |
| 4,441,785 | 4/1984 | Petrozello | 350/96.20 |
| 4,512,627 | 4/1985 | Archer et al. | 350/96.20 |
| 4,514,034 | 4/1985 | Bruch | 350/96.20 |
| 4,557,555 | 12/1985 | Stoerk et al. | 350/96.20 |
| 4,568,143 | 2/1986 | Yamada et al. | 350/96.20 |
| 4,580,873 | 4/1986 | Levinson | 350/96.20 |
| 4,582,391 | 4/1986 | Legrand | 350/96.20 |
| 4,585,301 | 4/1986 | Bialkowski | 350/96.20 |
| 4,589,726 | 5/1986 | Buhrer | 350/96.20 |
| 4,607,910 | 8/1986 | Thurenius | 350/96.20 |
| 4,789,228 | 12/1988 | Le Pesant et al. | 350/355 |
| 4,790,621 | 12/1988 | Calaby et al. | 350/96.20 |
| 4,834,488 | 5/1989 | Lee | 350/96.20 |
| 4,859,022 | 8/1989 | Opdahl et al. | 350/96.20 |
| 4,938,552 | 7/1990 | Jebens et al. | 350/96.20 |
| 4,946,236 | 8/1990 | Dautartas et al. | 350/96.13 X |

FOREIGN PATENT DOCUMENTS 2176023 12/1986 United Kingdom .

OTHER PUBLICATIONS

"Fully-reversible 'moving fiber' switch permits enhanced applications," by Andrew Gurbaxani in SPIE, vol. 839 Components for Fiber Optic Applications II (1987) pp. 67-72.

Primary Examiner—Akm Ullah
Attorney, Agent, or Firm—Gary L. Griswold; Walter N. Kirn; Stephen W. Buckingham

[57] ABSTRACT

An optical fiber switch has a substrate with a straight groove into which the free ends of two optical fibers are pushed into abutting relation to permit signals incoming on one of the fibers to be transmitted to the other. Preferably, the switch is a 2×2 fiber array. In one 2×2 switch, a substrate has two mutually perpendicular surfaces, each formed with a pair of grooves, and all four optical fibers are simultaneously pushed into one set of grooves to connect the fibers in one way, or pushed into the other set of grooves to switch the alignment. In a different 2×2 switch, a substrate has a central, longitudinal passageway that is square in cross section, and the grooves are provided by the four corners of the passageway.

13 Claims, 4 Drawing Sheets

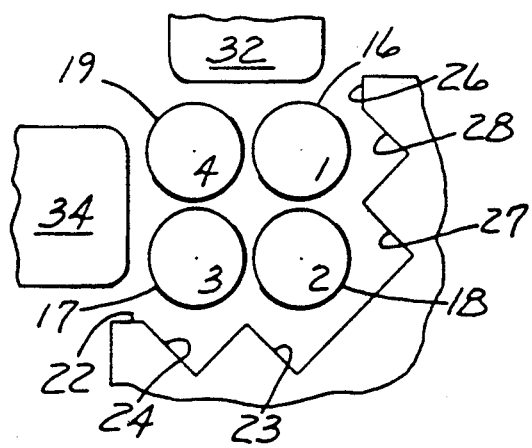
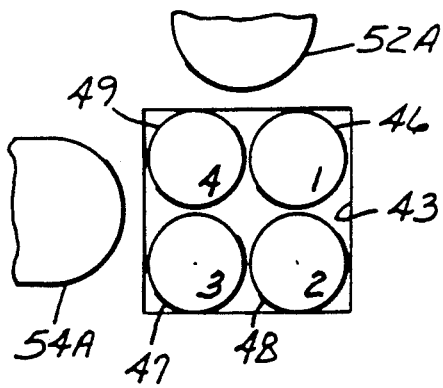
Fig. 1A    Fig. 2A
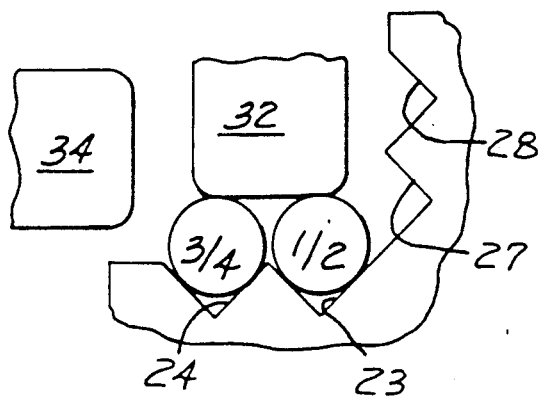
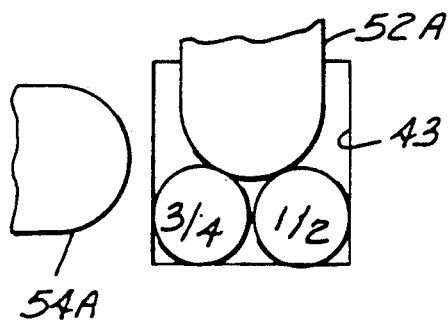
Fig. 1B    Fig. 2B
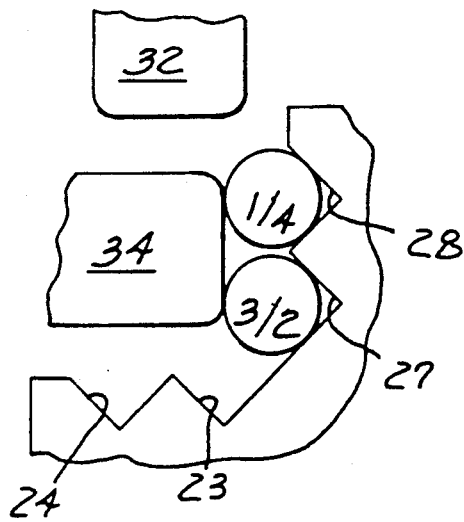
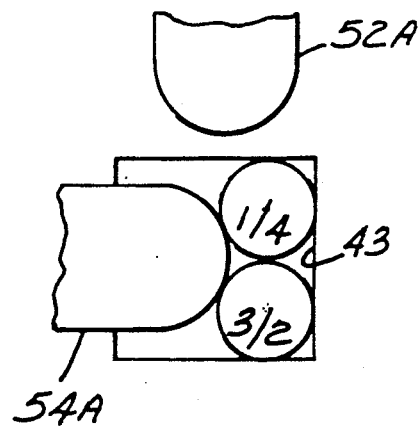
Fig. 1C    Fig. 2C

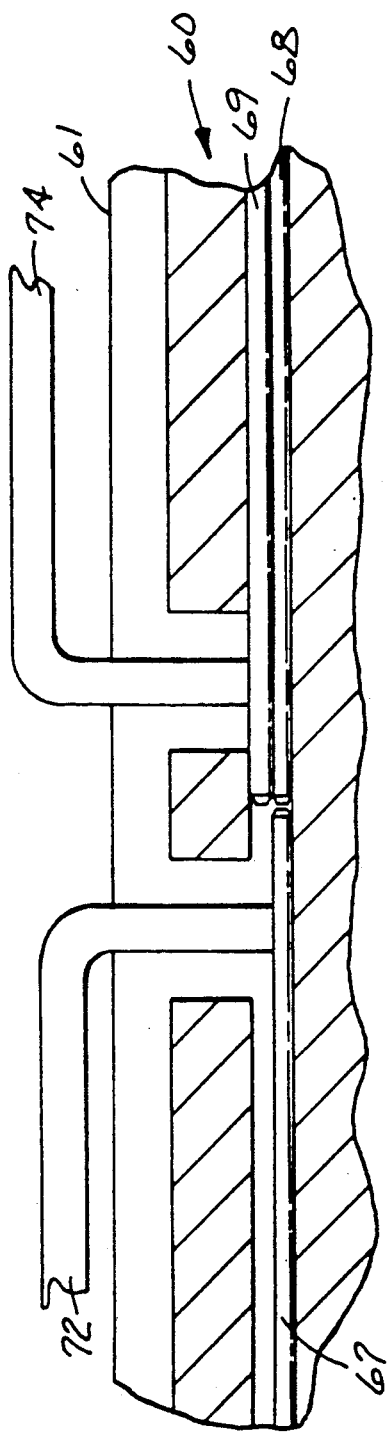
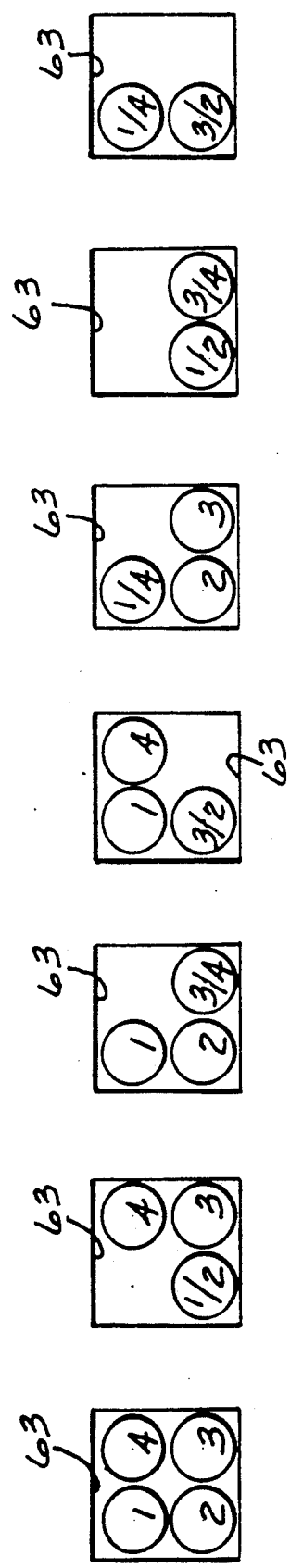
Fig 4
Fig 5A  Fig 5B  Fig 5C  Fig 5D  Fig 5E  Fig 5F  Fig 5G

OPTICAL FIBER SWITCH

BACKGROUND OF THE INVENTION

1. Field of the Invention

The invention concerns devices for mechanically switching optical signal paths between optical fibers and is particularly concerned with a 2×2 switching array.

2. Description of the Related Art

Numerous devices have been proposed for switching an incoming optical signal path to different outgoing optical fibers. Some such switches physically move the optical fibers so that their ends can be in abutting relationship with different optical fibers as in U.S. Pat. No. 4,337,995 (Tanaka et al.); No. 4,189,206 (Terai et al.); No. 4,223,978 (Kummer et al.); and No. 4,407,562 (Young). The switch of U.S. Pat. No. 4,568,143 (Yamada et al.) has a stationary block holding two input optical fibers and a movable block holding four output fibers to permit contact between the ends of various of the input and output fibers. The switch of U.S. Pat. No. 4,441,785 (Petrozello) has a rotary drum containing short lengths of optical fibers by which incoming signals on one set of optical fibers can be channeled to different outgoing optical fibers. Some switches use a movable prism as in U.S. Pat. No. 4,790,621 (Calaby) and or combination of prisms as in U.S. Pat. No. 4,303,303 (Aoyama).

Each of the above-cited switches and every other prior optical fiber switch of which I am aware is or would be expensive to manufacture and typically requires a large number of precision parts.

SUMMARY OF THE INVENTION

The invention provides an optical fiber switch that requires only a few mechanical parts and should be more economical to manufacture than are prior optical fiber switches while providing at least equally reliable switching with minimal attenuation. Briefly, the novel switch comprises a substrate formed with a straight precision groove, means for mounting a first optical fiber to have a free end normally extending in substantially parallel juxtaposition to and out of contact with said groove, means for pushing said unsupported end into said groove, and means for positioning a second optical fiber with an end in abutting relationship with the free end of the first fiber when said free end is seated in said groove and out of alignment when said free end is in its normal position.

Said positioning means can be provided by an extension of said groove and by designing said pushing means to seat an unsupported end of each of the first and second optical fibers in the extended groove.

Typically, the jacket of each of the first and second optical fibers has been stripped back to expose their protective buffers which also have been stripped back to make said free ends bare. A proximal portion of the bare end is bonded to the substrate to leave a distal portion of the fiber projecting freely in substantially parallel juxtaposition to the groove, and the distal portion becomes seated in the groove when the pushing means is actuated.

By "a bare end" is meant the portion of the optical fiber from which the buffer is stripped off, e.g., a core-cladding. When there is a non-strippable protective layer beneath the buffer, that protective layer is part of the bare end.

For switching between optical fibers of different sizes, the groove of the mount of the novel connector can be formed with a step to permit the first and second optical fibers to be coaxial upon actuation of the pushing means.

The novel switch should have its greatest utility in 2×2 switching arrays. In one 2×2 switching array of the invention, a substrate is formed to have two mutually perpendicular surfaces, each formed with a pair of straight, parallel precision grooves. First and third optical fibers are mounted with their free ends normally in parallel juxtaposition to different grooves of each pair, and the second and fourth optical fibers are mounted with their free ends projecting parallel to the free ends of the first and third optical fibers and in the opposite direction, with all four free ends terminating substantially in a plane that is orthogonal to the grooves. The second and fourth optical fibers normally are out of alignment with the first and third fibers but likewise extend in parallel juxtaposition to different grooves of each pair.

Another 2×2 switch of the invention has an elongated base block formed with a precision, central, longitudinal passageway that is substantially square in cross section, and the grooves are provided by the four corners of the passageway.

A 2×2 switch of the invention should have at least two pushing means. When it has only two pushing means, one can push four optical fibers into a first pair of grooves and another can push the four into a second pair of grooves. When pushed into the first pair of grooves, the free ends of the first and third optical fibers are abutting the ends of the second and fourth fibers, respectively. When pushed into the second pair of grooves, the free ends of the first and third optical fibers abut those of the fourth and second, respectively.

By equipping a 2×2 switching array with four pushing means, each of which simultaneously pushes two of the four fibers into one of the two pairs of grooves, any of six switching combinations can be achieved as illustrated in FIGS. 5B-G of the drawings, or the switch can be left in the off position of FIG. 5A.

The pushing means can be electrically or mechanically energized and can be so controlled that all four fibers are always seated in one of the two pairs of grooves except when being switched.

BRIEF DESCRIPTION OF THE DRAWINGS

The invention may be more easily understood in reference to the drawing, all figures of which are schematic. In the drawings:

FIGS. 1A, 1B and 1C diagramatically illustrate the operation of the switch of FIG. 1;

FIG. 2A is a cross section at line 2A—2A of FIG. 2 and, together with FIGS. 2B and 2C, diagramatically illustrates the operation of the switch of FIG. 2;

FIG. 4 is a fragmentary longitudinal cross section of the switch of FIG. 3; and

FIGS. 5A–G diagramatically illustrate the operation of the switch of FIG. 3.

DETAILED DISCLOSURE

Figure 1:
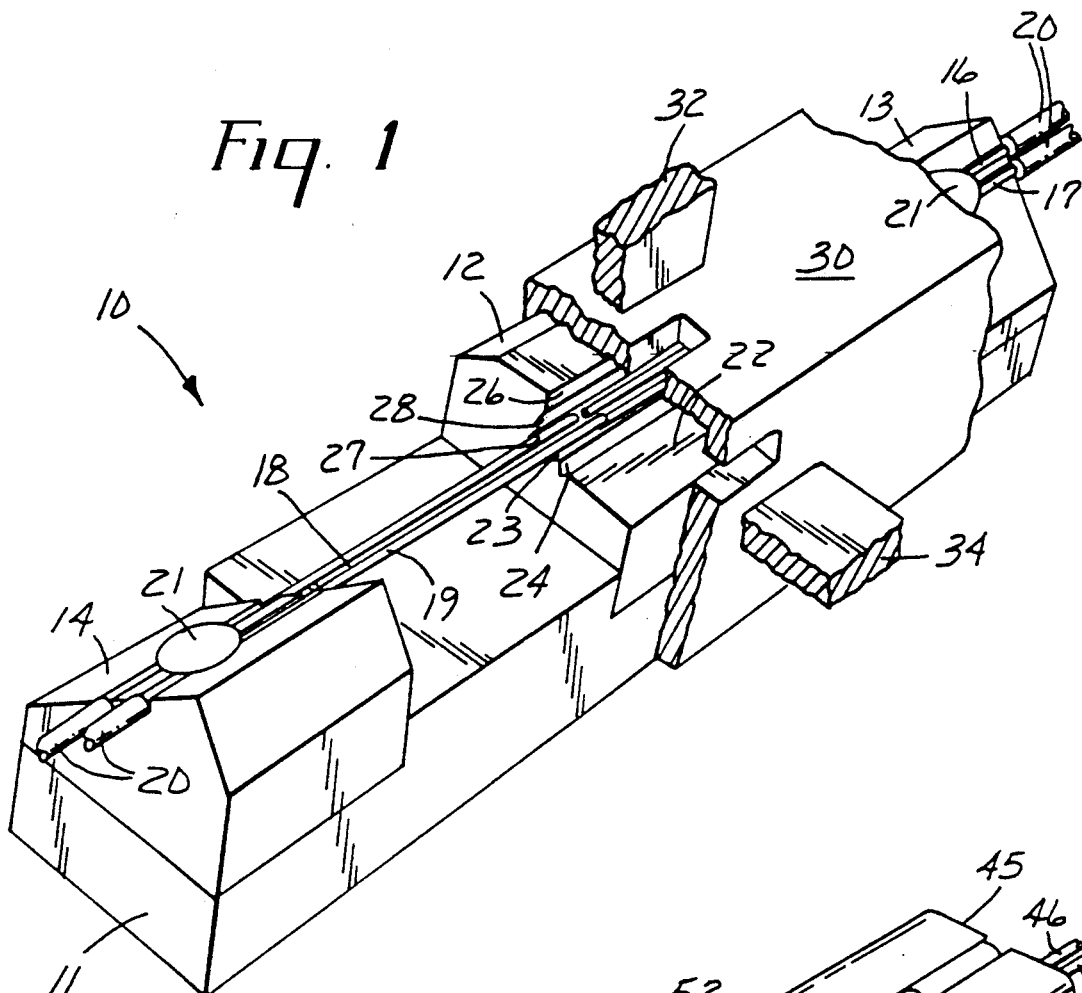
FIG. 1 is a fragmentary perspective view of a first 2×2 optical fiber switch of the invention.

The optical fiber switch 10 of FIG. 1 has a substrate consisting of a base block 11, a meet block 12 mounted at the center of the base block, and a pair of anchor blocks 13 and 14 mounted at the extremities of the base block. Incoming signals are received through a pair of optical fibers, here called first fiber 16 and third fiber 17, and are transmitted through the switch to a pair of optical fibers, here called second fiber 18 and fourth fiber 19. The buffer 20 of each of the fibers has been stripped off, and a proximal portion of a bare end of each fiber has been bonded at 21 to one of the anchor blocks 13 and 14 such that a distal portion of each bare end of the first and third fibers 16 and 17 projects in opposition to the free ends of the second and fourth optical fibers 18 and 19.

Formed in a first surface 22 of the meet block 12 are a first pair of straight, parallel precision V-grooves 23 and 24. Formed in a second surface 26 of the meet block which is perpendicular to the first surface 22 are a second pair of straight, parallel precision V-grooves 27 and 28. A plane bisecting each of the V-grooves is orthogonal to the surface at which the groove is formed. In the absence of any force, (a) the distal or free end of each of the four optical fibers projects in parallel juxtaposition to one groove of each pair of grooves as shown in FIG. 1A; (b) the free ends of first and third fibers 16 and 17 are out of alignment with the free ends of second and fourth fibers 18 and 19; and (c) the free ends of all four optical fibers terminate substantially in a plane that is orthogonal to the grooves.

Mounted in the cover 30 of the switch 10 are a first pushing means 32, which pushes the free ends of the optical fibers in the vertical direction when the switch is oriented as in FIG. 1, and a second pushing means 34 which pushes the free ends horizontally. The first pushing means 32 seats the four fibers in the first pair of grooves 23 and 24 as shown in FIG. 1B, and the second pushing means 34 seats the four fibers in the second pair of grooves 27 and 28 as shown in FIG. 1C. When positioned as shown in FIG. 1B, incoming signals in first and third fibers 16 and 17 are transmitted through second and fourth fibers 18 and 19, respectively; when positioned as shown in FIG. 1C, incoming signals in first and third fibers 16 and 17 are transmitted through fourth and second fibers 19 and 18, respectively.

By omitting the fourth optical fiber 19 from the switch 10, signals can be transmitted between the second optical fiber 18 and either the first or third optical fibers 16 and 17, and there is no need for two of the grooves 24 and 28. By also omitting the third optical fiber 17, the switch can be used to transmit optical signals between the first and second optical fibers 16 and 18 or to interrupt such transmission.

Figure 2:
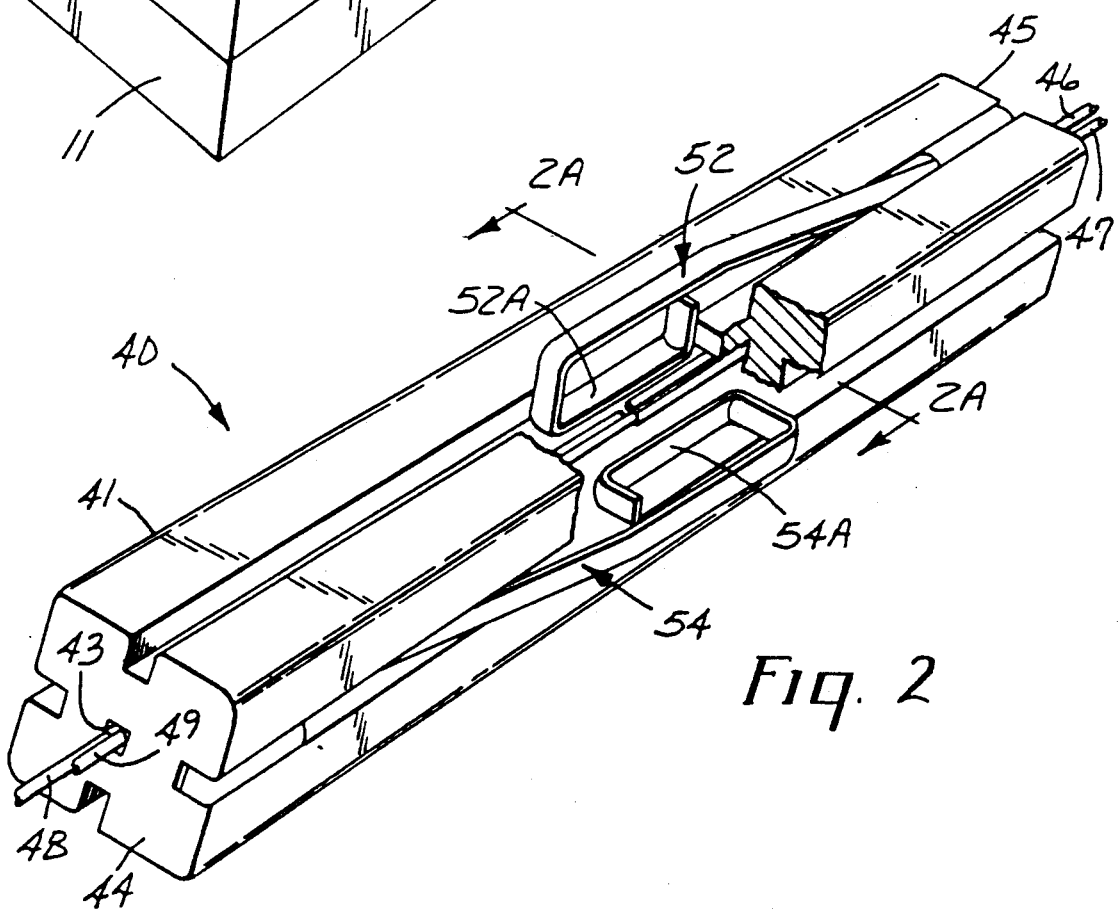
FIG. 2 is an perspective view of a second 2×2 optical fiber switch of the invention, partly broken away to reveal details.

The 2×2 switch 40 of FIG. 2 has an elongated base block 41 which is formed with a precision, central, longitudinal passageway 43 that is substantially square in cross section but may have filleted corners. A proximal portion of an end of each of first and third optical fibers 46 and 47 has been bonded to the walls of the passageway 43 at one extremity of the block 41 so that the distal end of each fiber projects to approximately the midpoint of the passageway. A proximal portion of an end of each of second and fourth optical fibers 48 and 49 has been similarly bonded into the passageway 43 so that its distal end projects in the opposite direction. Each wall of the passageway 43 is slightly wider than two diameters of the free end of each fiber.

The projecting distal or free ends of the four fibers, when not subjected to any force, appear as illustrated in FIG. 2A and terminate substantially in a plane that is orthogonal to the corners of the passageway 43.

Pivotably mounted on the block 41 are a first spring lever 52 and a second spring lever 54. The bent-back actuating end 52A and 54A, respectively, of each spring lever has a rounded profile as seen in FIGS. 2A–C. When the first spring lever 52 is depressed, its actuating end 52A pushes the four fibers downwardly and outwardly (obliquely) to the positions shown in FIG. 2B, thus seating each of the fibers in one of the two grooves provided by the two lower corners of the mutually perpendicular walls of the passageway 43. In this position, the optical fibers are precisely aligned, and incoming signals on the first and third optical fibers 46 and 47 are transmitted on the second and fourth optical fibers 48 and 49, respectively. When the second spring lever 54 is depressed, the four fibers are pushed obliquely into corners as shown in FIG. 2C, thus switching the transmission from the first and third optical fibers 46 and 47 to the fourth and second optical fibers 49 and 48, respectively.

Because the second optical fiber 48 assumes the same position under the action of both levers, it could be permanently bonded into the corner into which it is pushed.

Figure 3:
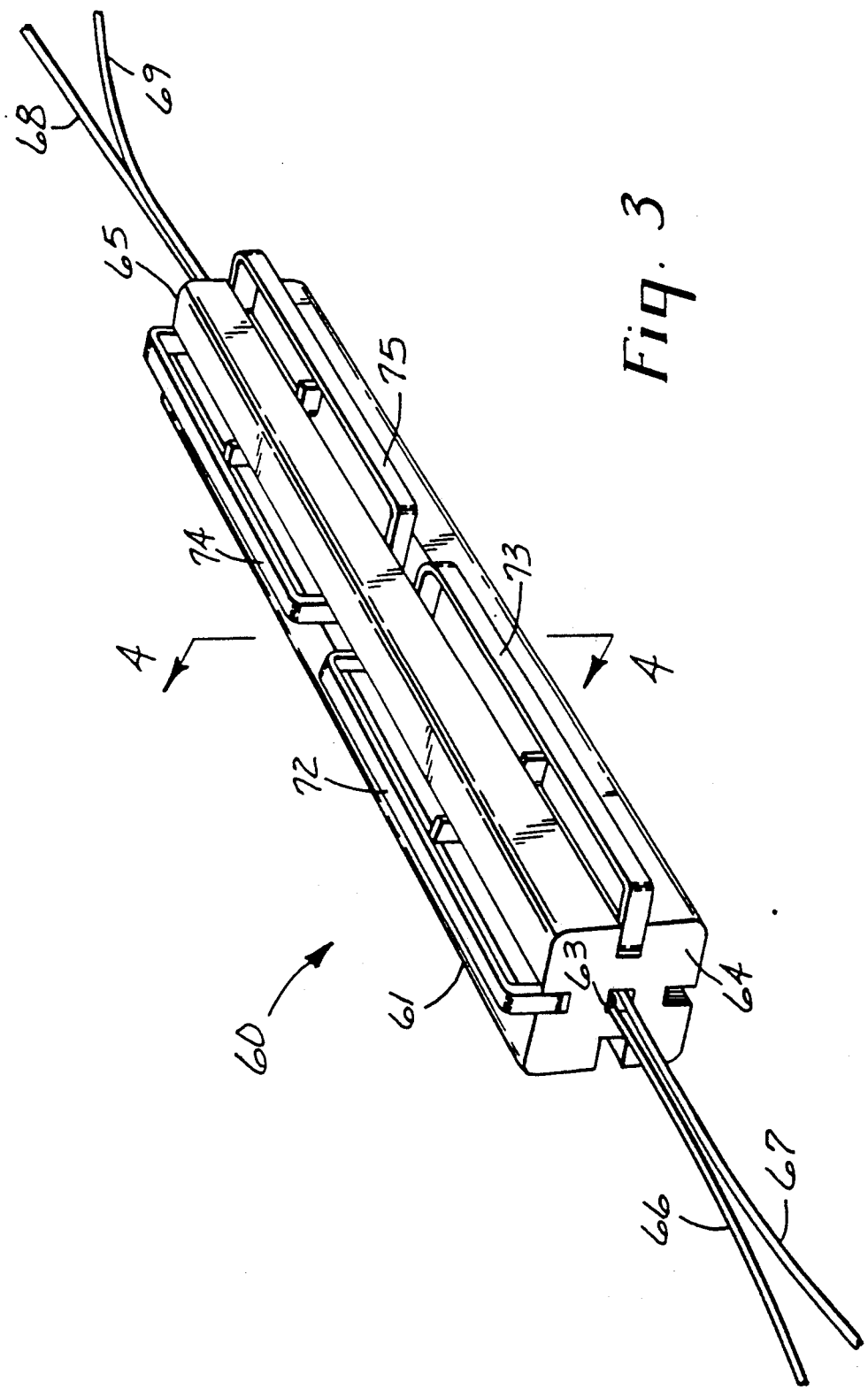
FIG. 3 is an perspective view of a third 2×2 optical fiber switch of the invention.

The 2×2 switch 60 of FIG. 3 has an elongated base block 61 with a precision, central, longitudinal passageway 63 that is substantially square in cross section. Bonded to the walls of the passageway at one extremity of the block 61 are proximal portions of the ends of first and third optical fibers 66 and 67, and bonded at the opposite extremity of the block are proximal portions of the ends of second and fourth optical fibers 68 and 69. Each wall of the passageway 63 is slightly wider than two diameters of the bare fibers.

The projecting distal or free ends of the four fibers, when not subjected to any force, are in the position illustrated in FIG. 5A and terminate substantially in a plane that is orthogonal to the corners of the passageway 63.

Pivotably mounted on the block 61 are four spring levers 72, 73, 74 and 75, each of which acts against only two of the four optical fibers. As indicated in FIG. 4, when only the spring lever 72 is depressed, the first optical fiber 66 is pressed into a lower corner at which it is hidden by the third fiber 67 and approximately aligned with the second fiber 68 which is not subjected to any force, allowing optical signals to pass only between the first and second fibers. Depressing only one of the spring lever 73, 74 and 75 results in the approximate alignment of FIGS. 5C, 5D and 5E, respectively.

When the spring levers 72 and 74 are depressed simultaneously, all four optical fibers are pushed obliquely into the lower corners as in FIG. 5F wherein both the first and second optical fibers 66 and 68 are precisely aligned in one corner and the third and fourth optical fibers 67 and 69 are precisely aligned in another corner of the passageway 63.

When spring levers 73 and 75 are pressed simultaneously, the optical fibers are pushed obliquely into corners of the passageway as shown in FIG. 5G, again affording precise alignment of the optical fibers.

EXAMPLE

The switch 40 of FIG. 2 can be made by drawing glass through an orifice and then using a laser to cut spring-lever openings. Key dimensions:

| | |
|---|---|
| block 41 | 2 mm square |
| length | 20 mm |
| passageway 43 | 255 µm square |
| diameter of optical fibers | 125 µm |
| spring levers 52, 54 | |
| overall length | 11 mm |
| width | 0.25 mm |
| radius of end 52A | 125-250 µm |

What is claimed is:

1. A 2×2 optical fiber switch comprising
    a substrate formed to have four straight, parallel precision grooves in two pairs,
    means for mounting on the substrate first and third optical fibers, each having a free end that normally projects in substantially parallel juxtaposition to one groove of each pair,
    means for mounting on the substrate second and fourth optical fibers, each having a free end that normally projects
       in the opposite direction to and out of alignment with the free ends of the first and third fibers, and
       in substantially parallel juxtaposition to one groove of each pair such that each of the four optical fibers is in juxtaposition with a unique two of said four grooves,
    the free ends of all of said fibers terminating substantially in a plane that is orthogonal to the grooves, and
    means for pushing each of said free ends into either of the two grooves with which it is alignment and in abutting relationship with a free end of another of said fibers.

2. An optical fiber switch as defined in claim 1 wherein said pushing means includes means for simultaneously pushing all four optical fibers into one pair of grooves and means for simultaneously pushing all four optical fibers into the other pair of grooves.

3. An optical fiber switch as defined in claim 1 wherein said pushing means includes four separately actuable means, each for simultaneously pushing only two of said optical fibers into one pair of grooves.

4. An optical fiber switch as defined in claim 1 wherein the substrate comprises a base block, a pair of anchor blocks mounted at the extremities of the base block, and a meet block mounted at the center of the base block, which meet block is formed with two mutually perpendicular surfaces, and each of said pairs of grooves is formed in one of said surfaces.

5. An optical fiber switch as defined in claim 4 wherein a proximal portion of the free end of each of the first and third optical fibers is bonded to one of the anchor blocks, and a proximal portion of the free end of each of the second and fourth optical fibers is bonded to the other anchor block, so that the distal end of each fiber normally projects in substantially parallel juxtaposition to, and out of contact with, different grooves of each pair.

6. An optical fiber switch as defined in claim 1 wherein said substrate is formed with a precision, central, longitudinal passageway of substantially square cross section and each of its walls is slightly wider than two diameters of said free ends, said mounting means normally positions each of said free ends to extend along a corner of said passageway, one corner of the passageway defines two of said four grooves, and the two corners adjacent said one corner define the other two grooves.

7. An optical fiber switch as defined in claim 6 wherein said mounting means comprises means for bonding a proximal portion of the free end of each fiber to an extremity of said passageway such that the distal ends of the first and third optical fibers normally occupy diagonally opposite corners of said passageway, and the distal ends of the second and fourth optical fibers normally occupy the other two corners.

8. An optical fiber switch as defined in claim 7 wherein said pushing means comprises a plurality of spring levers pivotably mounted on the substrate.

9. An optical fiber switch as defined in claim 8 wherein each of said levers has a bent-back actuating and that has a rounded profile by which the free end of an optical fiber can be pushed obliquely into a groove provided by one of the corners of said passageway.

10. An optical fiber switch as defined in claim 9 wherein there are two of said spring levers, one positioned for simultaneously pushing the four optical fibers into grooves provided by two adjacent corners of said passageway, and the other positioned for pushing the free ends of the four fibers into two adjacent corners, only one of which is common to one of the first mentioned corners.

11. An optical fiber switch as defined in claim 9 wherein there are four of said spring levers, each of which is positioned for simultaneously pushing the free ends of only two of said optical fibers into grooves provided by two adjacent corners of said passageway.

12. An optical fiber switch comprising
    a substrate having a precision, central longitudinal passageway that is substantially square, one corner of said passageway forming a groove;
    means for mounting on the substrate first and third optical fibers with a free end of each terminating substantially in a plane that is orthogonal to said groove and normally extending in parallel juxtaposition to, and out of contact with, said groove, and said free ends of said first and third normally occupying diagonally opposite corners of said passageway;
    means for mounting on the substrate a second optical fiber with an end that normally occupies said groove such that said end of said second fiber is out of alignment with both of said free ends of said first and third optical fibers when all three of said fibers are in their normal positions; and
    means for pushing either of said free ends of said first and third optical fibers into said groove such that whichever of said free ends of said first and third optical fibers is in said groove will lie in abutting relationship with said end of said second optical fiber.

13. An optical fiber switch as defined in claim 12 wherein a proximal portion of each of said free ends is bonded to an extremity of the substrate at the corner of said passageway normally occupied by the distal portion of the free end.

* * * * *